United States Patent
Carney et al.

(10) Patent No.: US 8,774,185 B2
(45) Date of Patent: Jul. 8, 2014

(54) APPLICATION OF SERVICES IN A PACKET SWITCHING DEVICE

(75) Inventors: John C. Carney, Lexington, MA (US);
Timothy P. Donahue, Natick, MA (US);
Michael E. Lipman, Harvard, MA (US);
David Delano Ward, Somerset, WI (US); Doron Oz, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 761 days.

(21) Appl. No.: 12/844,786

(22) Filed: Jul. 27, 2010

(65) Prior Publication Data
US 2012/0027015 A1 Feb. 2, 2012

(51) Int. Cl.
*H04L 12/56* (2006.01)

(52) U.S. Cl.
USPC .......................................................... 370/392

(58) Field of Classification Search
CPC ...................................................... H04L 45/74
USPC .......................................... 370/392, 400, 389
See application file for complete search history.

(56) References Cited

U.S. PATENT DOCUMENTS

| | | | |
|---|---|---|---|
| 7,760,720 B2 | 7/2010 | Pullela et al. | |
| 8,005,098 B2 | 8/2011 | Barach et al. | |
| 8,379,640 B2 * | 2/2013 | Ichihashi et al. | 370/389 |
| 2011/0019677 A1 | 1/2011 | Townsley et al. | |
| 2011/0231659 A1 * | 9/2011 | Sinha | 713/168 |

* cited by examiner

*Primary Examiner* — Dang Ton
*Assistant Examiner* — Kevin Lee
(74) *Attorney, Agent, or Firm* — The Law Office of Kirk D. Williams

(57) ABSTRACT

A service is applied in a packet switching device to both directions of a flow of packets through the packet switching device, with the application of this Layer-4 to layer-7 service to one direction requiring state information shared from the application of the service to packets traversing in the other direction. The service (e.g. firewall, network address translation) can be applied by different processing complexes which do not share memory; thus, state information is communicated between the processing complexes. When the service is applied by a single processing complex, packets can be directed explicitly to the single processing complex. The inline application of services in a packet switching system typically eliminates the need to change a packet's path through the packet switching system to that through a dedicated application server, and may eliminate the need for a dedicated services card or blade server.

24 Claims, 5 Drawing Sheets

APPLICATION OF SERVICES IN A PACKET SWITCHING DEVICE

TECHNICAL FIELD

The present disclosure relates generally to packet switching devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

In addition to forwarding of packets, a packet switching device may apply a service to a flow of packets traversing the packet switching device in two directions (e.g., a flow of packets traveling in a first direction from a first host to a second host, and in the reverse direction from the second host to the first host). Examples of such are network address translation and firewall services. The application of these services to each direction of a packet flow depends on common state information. A known packet switching device implements these services on a services card or blade server, and thus, the path of each direction of a flow of packets traversing a packet switch is rerouted through the services card or blade server.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Figure 1:
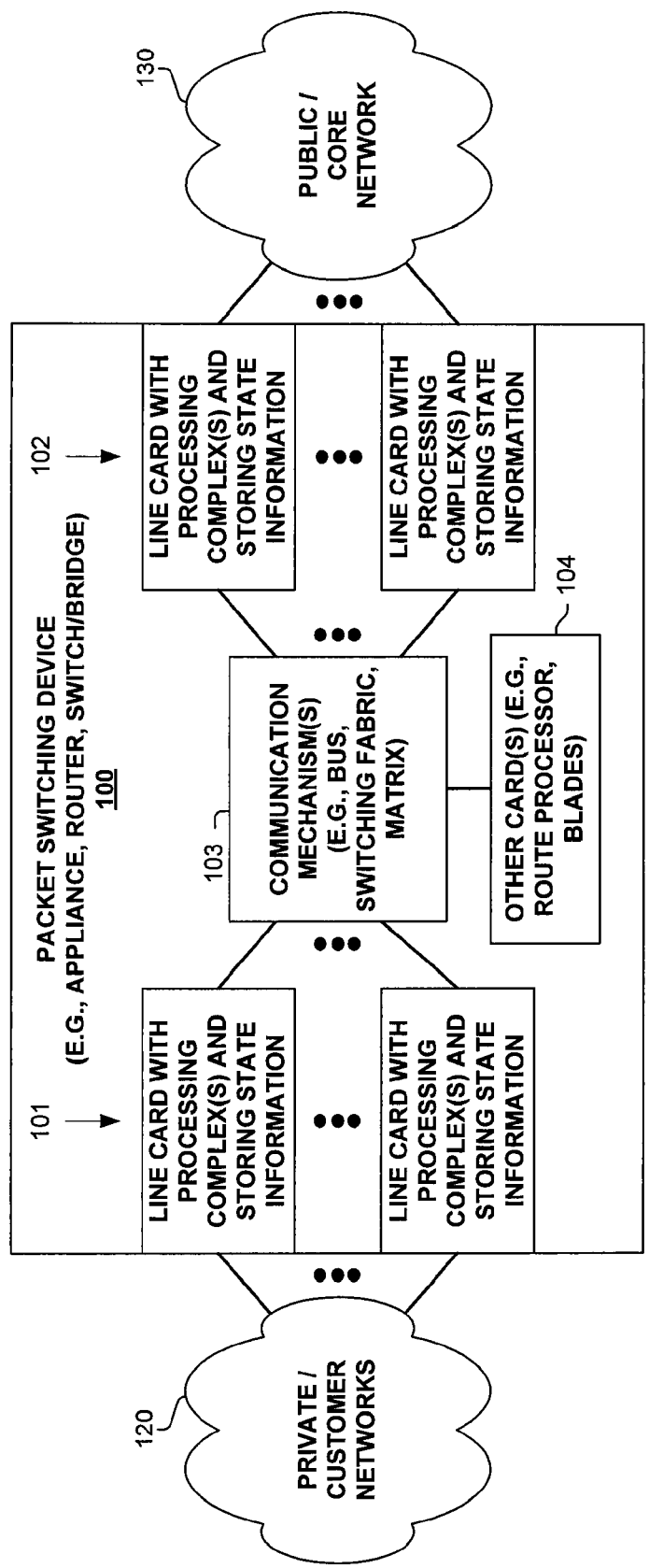
FIG. 1 illustrates a packet switching device operating according to one embodiment.

Disclosed are, inter alia, methods, apparatus, computer-storage media, mechanisms, and means associated with applying a service in a packet switching device to both directions of a flow of packets through a packet switching device, with the application of this service to one direction requiring state information shared from the application of the service to packets traversing in the other direction. Services that can be applied to both directions of a packet flow requiring shared state by one embodiment is extensible; and includes, but is not limited to, one or more of firewall and network address translation services.

One embodiment of a packet switching device performs a method, which includes: processing, by a first processing complex, packets of a flow of packets traveling in a first direction through a packet switching device; communicating state information from the first processing complex to a particular second processing complex, with said state information required for processing packets of the flow of packets traveling in a reverse direction of the first direction; and processing, by the particular second processing complex, packets of the flow of packets traveling in the reverse direction through the packet switching device; wherein said processing of the flow of packets traveling in the reverse direction includes using said communicated state information. In one embodiment, each of the first and second processing complexes also determine forwarding information for packets of the flow of packets, allowing the flow of packets not to have to be rerouted through a blade server or services card for additionally applying the application. In one embodiment, the first processing complex will not know the location of the second processing complex, especially when it is not known where the reverse direction of the flow will enter the packet switching device; and the first processing complex sends the state information to all possible second processing complexes which are candidates for being assigned the reverse direction of the packet flow.

One embodiment uses a single processing complex for applying a service to both directions of a flow of packets in a packet switching device. One embodiment informs other processing complexes of an association between the flow of packets and a particular processing complex. The other direction of the packet flow is sent to the particular processing complex (e.g., not simply to a line card with multiple processing complexes, which will not guarantee that the flow will go to the particular processing complex).

2. Description

Disclosed are, inter alia, methods, apparatus, computer-storage media, mechanisms, and means associated with applying a service in a packet switching device to both directions of a flow of packets through a packet switching device, with the application of this service to one direction requiring state information shared from the application of the service to packets traversing in the other direction. Services that can be applied to both directions of a packet flow requiring shared state by one embodiment is extensible; and includes, but is not limited to, one or more of firewall and network address translation services.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations within the scope and spirit of the invention, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the invention. Note, the term "apparatus" is used consistently herein with its common definition of an appliance or device.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Disclosed are, inter alia, methods, apparatus, computer-storage media, mechanisms, and means associated with applying a service in a packet switching device to both directions of a flow of packets through a packet switching device, with the application of this service (e.g., a Layer-4 to layer-7 services) to one direction requiring state information shared from the application of the service to packets traversing in the other direction. Services that can be applied to both directions of a packet flow requiring shared state by one embodiment is extensible; and includes, but is not limited to, one or more of firewall and network address translation services. Examples of these services/applications applied to packets in one embodiment include at least one application from a group of applications consisting of: layer-4, layer-5, layer-6, and layer-7 applications. In one embodiment, the service/application includes at least one application from a group of applications consisting of: Firewall (FW), Network Address Translation (NAT), Network-based Application Recognition (NBAR), deep packet inspection (DPI), authentication, encryption, and Internet Protocol Security (IPsec).

Expressly turning to the figures, FIG. 1 illustrates a packet switch device 100, coupled to private/customer networks 120 and public/core network 130. Note, packet switching device 100 can be coupled to any one or more networks, with one embodiment with packet switching device 100 being in the role of an edge router. Further, packet switching device may be a router or a switch/bridge; and is an appliance (in contrast to multiple packet switching devices communicatively coupled via a network).

As shown, packet switching device 100 includes line cards 101, 102; and other card(s) 104 (e.g., router processor, services cards, etc.). Each of lines cards 101, 102 typically has one or more processing complexes for processing packets. Note, the term "processing complex" is used herein to refer to one or more processing elements with memory associated therewith. Thus, a processing complex may have multiple processors with access to memory shared among them (e.g., for storing state information in applying a service), but a different processing complex will not have native access to the memory of another processing complex.

In one embodiment, a service will be applied by two different processing complexes (typically, but not required to be on different line cards 101, 102) to each direction of a packet flow traversing packet switching device 100, with the application of the service to one direction requiring state information from the application in the other direction. Each of these two different processing complexes will share the necessary information. In one embodiment, these two different processing complexes also perform forwarding (e.g., routing) processing, such as that normally done by a packet switching device. Such a processing complex will process a packet which includes both forwarding and service application. Thus, in one embodiment, a packet can traverse a same path through a packet switching device whether or not a service is applied, because the processing complex processing the packet including determining forwarding information. Furthermore, in one embodiment, resources are not consumed to reroute the packet through the packet switching device to another location (e.g., services blade, blade server) for application of the service.

In one embodiment, initially only one of these two processing complexes will be known. For example, in one embodiment, packet switching device 100 is configured to perform network address translation (NAT) from a customer network 120 to public network 130. In response to receiving the first one or more packets of a particular flow, a processing complex on a line card 101 will initialize state information for the NAT processing. However at this point in time, this processing complex typically will not know which processing complex on one of line cards 102 will process packets of the packet flowing traveling in the reverse direction. One embodiment sends this state information to multiple line cards 102 to cover all possible arrival processing complexes. In one embodiment, a priori assignment of a range of values (e.g., NAT addresses, hashed flows) are assigned to processing complexes so that the other processing complex can be readily identified. In one embodiment, processing complexes receive this state information and determine whether or not to store it depending on whether they are associated with a virtual router, switch, or local area network also associated with the packet flow. Thus, when packets of the packet flow traversing in the reverse direction are received by a processing complex on one of line cards 102, this processing complex has the requisite state information to apply the service to these packets. The two processing complexes processing packets of the flow headed in each direction can then exchange state information between themselves, or it can be provided to additional processing complexes so that if one of the arriving paths of the flow of packets changes (e.g., such as due to a change in the number of paths over a bundled interface) causing a different processing complex to process these packets, this new processing complex will have the requisite state information to continue (or at least an identification of the processing complex processing packets traversing in the opposite direction).

In one embodiment, the application of a service to packets traversing packet switching device 100 in both directions is performed by a single processing complex on a line card 101, 102. In this case, rather than sending state information, a first processing complex will notify other processing complexes (e.g. all, less than all, a subset corresponding to a virtual router, switch, or local area network also associated with the packet flow) that it will be performing the application of the service. Thus, these other processing complexes can send packets of the flow of packets directly to this first processing complex, and not simply to a corresponding line card 101, 102. In one embodiment, a processing complex not applying the service will process the packet to determine forwarding information, which typically may include an identification of an egress line card. One embodiment supplements or replaces some or all of this forwarding information to specify an identification of the first processing complex, such that the packet is sent to the first processing complex (in contrast to simply forwarding to a line card including the first processing complex). In one embodiment, a particular line card 101, 102 including the first processing complex will include multiple processing complexes. By having the other processing complex specify the first processing complex, the particular line card will not be required to perform an operation (e.g., lookup, hashing) to identify the first processing complex. Note, one embodiment supplements a forwarding information base (FIB) to include an identification of processing complexes instead of, or in addition to, line cards; and one embodiment maintains a separate data structure (e.g., in a memory or associative memory) for identifying a processing complex to which to forward packets of a particular packet flow.

Figure 2:
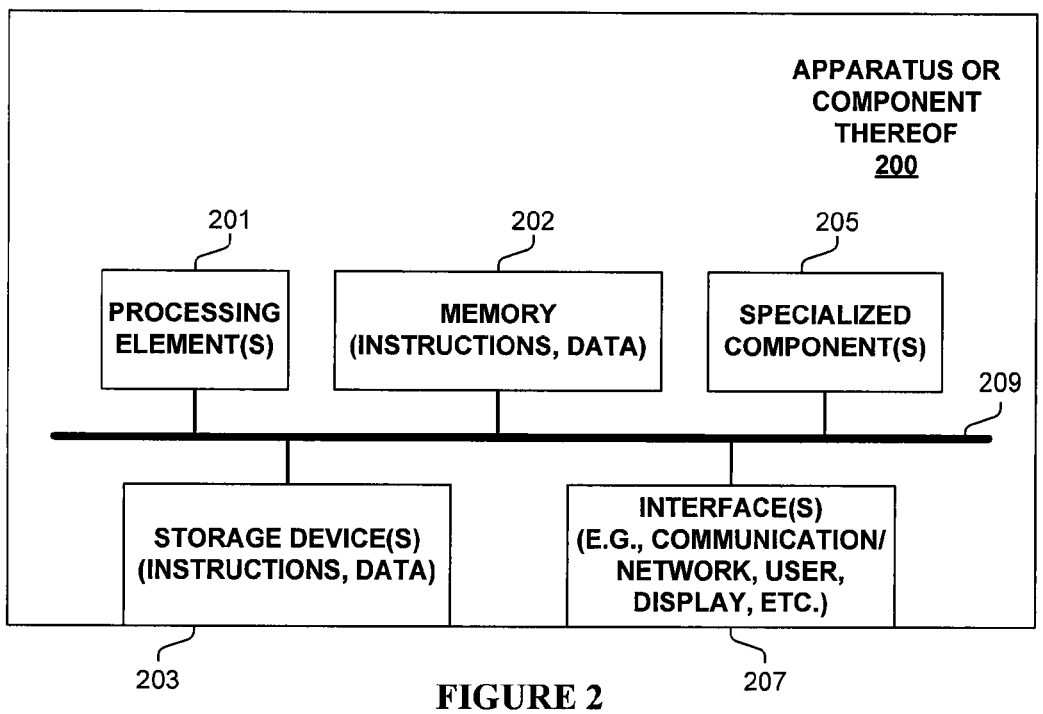
FIG. 2 illustrates an apparatus or component used in one embodiment.

FIG. 2 is block diagram of an apparatus or component 200 used in one embodiment associated with applying services in a packet switching device to both directions of a flow of packets. In one embodiment, apparatus or component 200 performs one or more processes corresponding to one of the flow, block, or other diagrams illustrated or otherwise described herein.

In one embodiment, apparatus or component 200 includes one or more processing element(s) 201, memory 202, storage device(s) 203, specialized component(s) 205 [e.g. optimized hardware such as for performing lookup operations (e.g., content-addressable memories, ternary content-addressable memories) etc.], and interface(s) 207 for communicating information (e.g., sending and receiving packets, user-interfaces, displaying information, etc.), which are typically communicatively coupled via one or more communications mechanisms 209, with the communications paths typically tailored to meet the needs of the application. In one embodiment apparatus or component 200 corresponds to, or is part of, packet switching device 100 of FIG. 1.

Various embodiments of apparatus or component 200 may include more or less elements. The operation of apparatus or component 200 is typically controlled by processing element(s) 201 using memory 202 and storage device(s) 203 to perform one or more tasks or processes. Memory 202 is one type of computer-readable/computer-storage medium, and typically comprises random access memory (RAM), read only memory (ROM), flash memory, integrated circuits, and/or other memory components. Memory 202 typically stores computer-executable instructions to be executed by processing element(s) 201 and/or data which is manipulated by processing element(s) 201 for implementing functionality in accordance with an embodiment. Storage device(s) 203 are another type of computer-readable medium, and typically comprise solid state storage media, disk drives, diskettes, networked services, tape drives, and other storage devices. Storage device(s) 203 typically store computer-executable instructions to be executed by processing element(s) 201 and/or data which is manipulated by processing element(s) 201 for implementing functionality in accordance with an embodiment.

Figure 3:
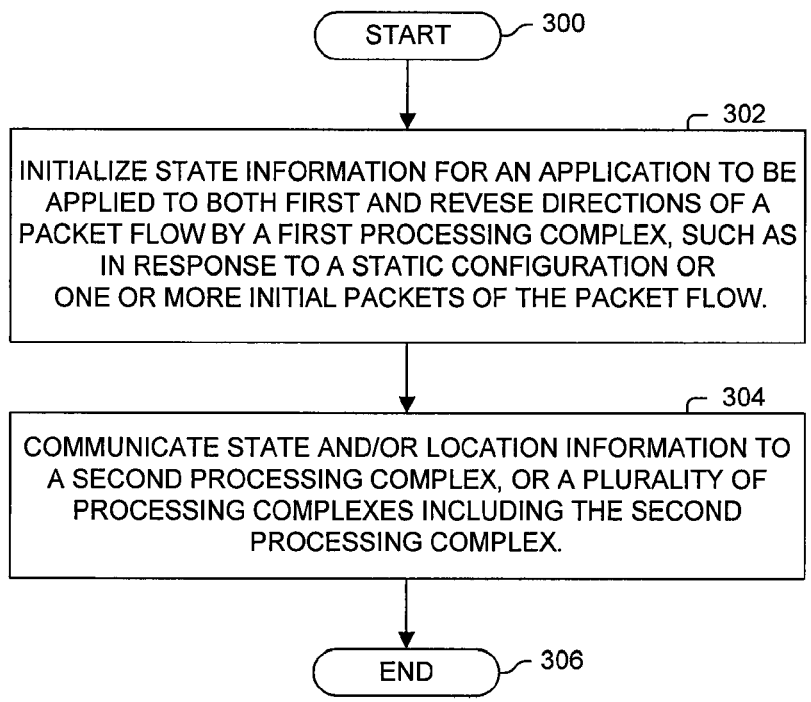
FIG. 3 illustrates a process performed in one embodiment.

FIG. 3 illustrates a process performed in one embodiment. Processing begins with process block 300. In process block 302, the state information is initialized, by a first processing complex, for an application to be applied to both first and reverse directions of a packet flow. In one embodiment, this initialization is performed in response to one or more initial packets of a packet flow, and/or was statically configured. In process block 304, state and/or location information is communicated to at least a second processing complex, or possibly multiple processing complexes which includes the second processing complex. Processing of the flow diagram of FIG. 3 is complete as indicated by process block 306.

Figure 4A:
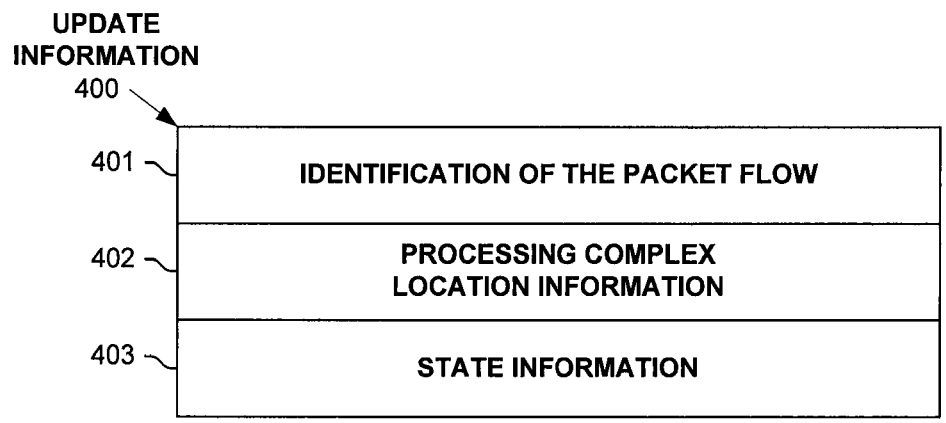
FIG. 4A illustrates information communicated in one embodiment.

Illustrated in FIG. 4A is information communicated in one embodiment. As shown, update information 400 includes: an identification of a packet flow (401); location information for the processing complex applying the service/application to one direction of the packet flow (402); and corresponding state information for use by another processing complex in processing packets of the packet flow traversing in the reverse direction (403). Thus, a receiving processing complex can identify the corresponding packet flow from field 401; knows the corresponding first processing complex to which to send state update information (and typically the sender of this update information 400) from field 402; and has requisite state information for proceeding with applying the service to the reverse direction of the packet flow from field 403. Note, in one embodiment, state information 403 includes an identification of the service to be applied.

Figure 4B:
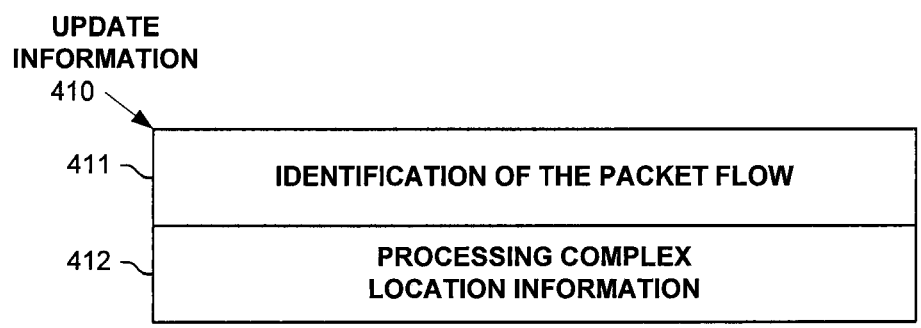
FIG. 4B illustrates information communicated in one embodiment.

Illustrated in FIG. 4B is information communicated in one embodiment. As shown, update information 410 includes: an identification of a packet flow (411); location information for the processing complex applying the service/application to both directions of the packet flow (412). Thus, a receiving processing complex can identify the corresponding packet flow from field 401; and knows the corresponding first processing complex to which to send packets of the packet flow.

Figure 5:
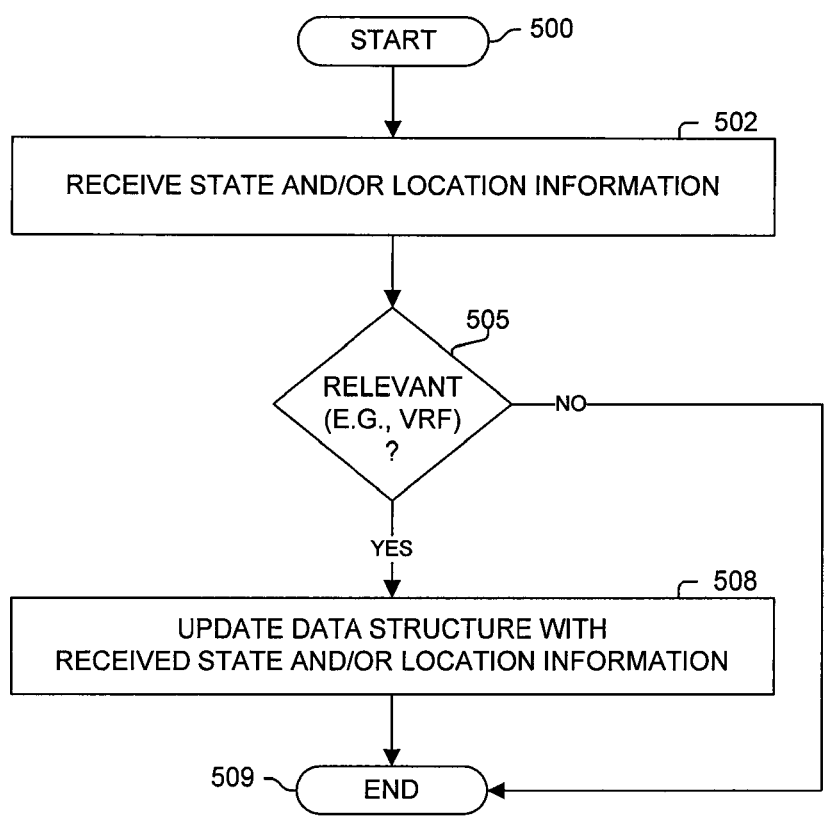
FIG. 5 illustrates a process performed in one embodiment.

FIG. 5 illustrates a process performed in one embodiment. Processing begins with process block 500. In process block 502, state and/or location information is received (e.g., update information 400 of FIG. 4A or 410 of FIG. 4B). As determined in process block 505, if the received update information is relevant to the receiving processing complex (e.g., the processing complex might receive packets of the flow traversing the packet switching device in the reverse direction, such as, but not limited to, being determined based on a particular virtual router, switch, or local area network associated with the packet flow), then, in process block 508, a data structure (e.g., in a memory or associative memory) is updated with the received update information (e.g., state and/or location information). Processing of the flow diagram of FIG. 5 is complete as indicated by process block 508.

Figure 6:
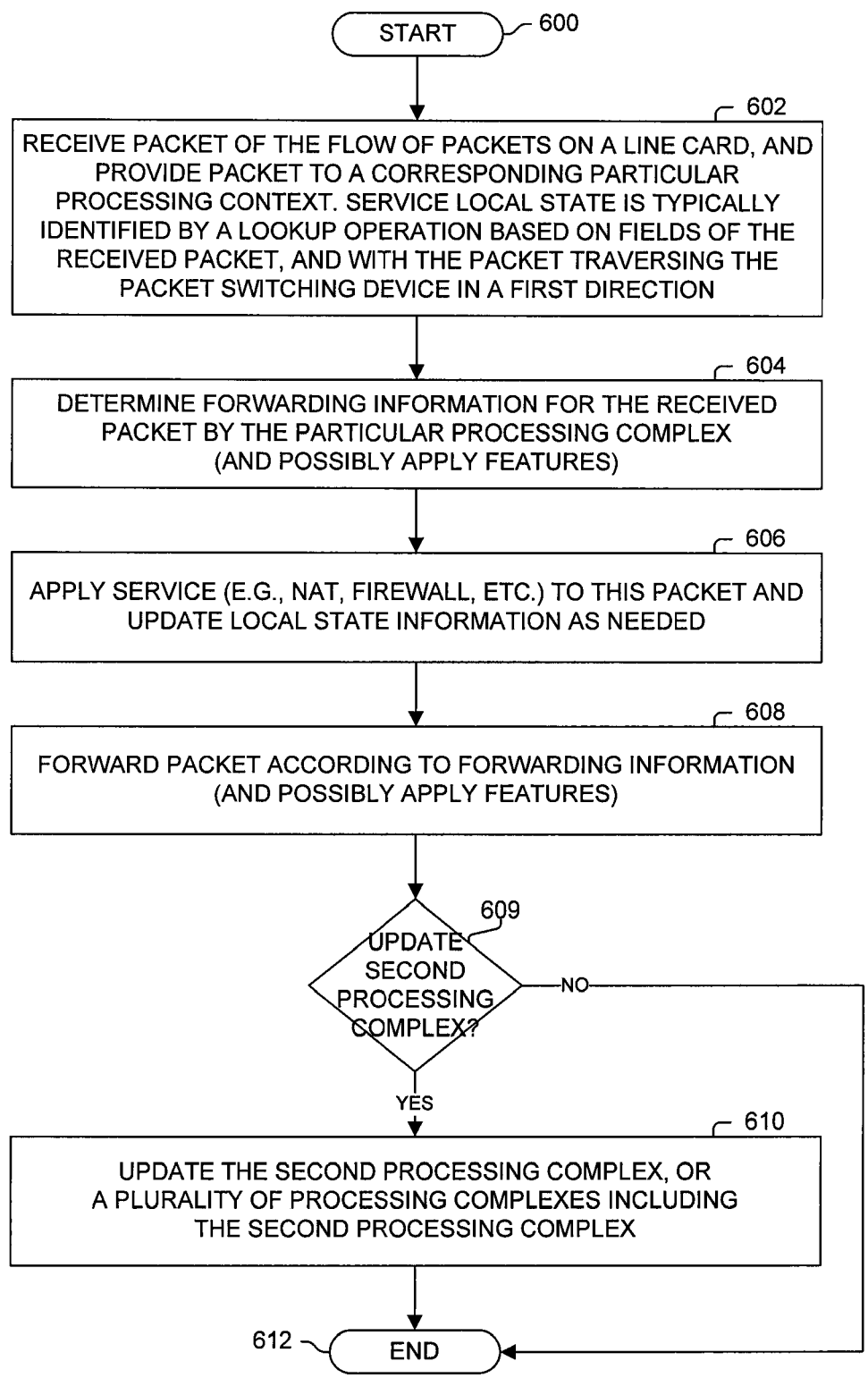
FIG. 6 illustrates a process performed in one embodiment.

FIG. 6 illustrates a process performed in one embodiment. Processing begins with process block 600. In process block 602, a packet traversing in a first direction of a flow of packets is received by a line card. This packet is provided to a particular processing complex of typically multiple processing complexes available to process the packet. The particular processing complex is typically identified based on an incoming interface, possibly in conjunction with a load balancing or other operation, such that all packets of the flow of packets traveling in the first direction will be provided to the particular processing complex. In one embodiment, all packets received on a particular one or more interfaces of the line card are forwarded to a same particular processing complex. In one embodiment, a lookup operation on one or more fields of a packet is used in identifying the particular processing complex for the packet. For a particular packet, the particular processing context typically acquires (from memory in particular processing complex) the local state information for the service to be applied based on a lookup operation performed on one or more fields of the particular packet.

In process block 604, the particular processing complex determines forwarding information for the packet (and possibly applies other features) using the service local state information. In process block 606, the particular processing complex applies the service to the packet and updates local state information as required by this processing. In process block 608, the packet is forward according to the determined forwarding information (and possibly applies other features). As determined in process block 609, if the state of processing of the application has changed such that it should notify the second processing complex that processes packets of the packet flow traversing the packet switching device in the reverse direction (which includes applying the service to these packets), then in process block 610, the second processing complex (and possibly to multiple processing complexes including the second processing complex) is sent updated state information (e.g., update information 400 of FIG. 4A). Processing of the flow diagram of FIG. 6 is complete as indicated by process block 612.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, comprising:

service processing and distinct forwarding processing, by a first processing complex on a first line card of a packet switching device, packets of a flow of packets traveling in a first direction through the packet switching device and received on an interface of the first line card, with said forwarding processing including determining a second line card as the egress line card;

communicating state information from the first processing complex to a particular second processing complex on the second line card of the packet switching device via a switching fabric or a switching matrix internal to the packet switching device, with said state information required for service processing packets of the flow of packets traveling in a reverse direction of the first direction;

forwarding packet of the flow of packets from the first line card over the switching fabric or the switching matrix to the second line card based on said determination of the second line card as the egress line card, wherein there are a plurality of paths through the packet switching device that packets of the flow of packets could take from ingress to egress, with the plurality of paths including a same path through the packet switching device taken by packets of the flow of packets, wherein the same path would be taken by packet of the flow of packets if only forwarding processing without said service processing was performed;

service processing, by the particular second processing complex, packets of the flow of packets traveling in the reverse direction through the packet switching device; wherein said processing of the flow of packets traveling in the reverse direction includes using said communicated state information; and forwarding packets of the flow of packets from the packet switching device via an interface on the second line card.

2. The method of claim 1, including: communicating said state information from the first processing complex to a plurality of second processing complexes; wherein the plurality of second processing complexes includes the particular second processing complex; and wherein said operation of communicating said state information to the plurality of second processing complexes includes the operation of communicating state information to the particular second processing complex.

3. The method of claim 2, including communicating second state information from the particular second processing complex to the first processing complex, with said second state information required for processing packets of the flow of packets traveling in the first direction through the packet switching device.

4. The method of claim 3, wherein each of said processing by the first processing complex and said processing by the particular second processing complex includes applying a Layer-4 to layer-7 application to packets of the flow of packets.

5. The method of claim 4, wherein each of the plurality of second processing complexes is on a different line card than the first line card and other line cards of the plurality of second processing complexes.

6. The method of claim 5, wherein said application is network address translation.

7. The method of claim 1, wherein each of said processing by the first processing complex and said processing by the particular second processing complex includes applying a Layer-4 to layer-7 application to packets of the flow of packets.

8. The method of claim 7, wherein said application is network address translation.

9. The method of claim 2, wherein each processing complex of a group of the first processing complex and the plurality of second processing complexes does not have a common memory space for sharing said state information with another of the group of the first processing complex and the plurality of second processing complexes.

10. The method of claim 2, comprising: determining the plurality of second processing complexes from a larger plurality of processing complexes based on each of the plurality of second processing complexes being associated with processing packets belonging to a particular virtual router, switch, or local area network.

11. The method of claim 10, wherein said communicating includes sending said state information to the larger plurality of processing complexes; and the method includes each of the second plurality of processing complexes identifying to store said state information based on its said association with the particular virtual router, switch, or local area network.

12. The method of claim 1, including: communicating said state information from the first processing complex to a plurality of second processing complexes; wherein the plurality of second processing complexes includes the particular second processing complex; and wherein said operation of communicating said state information to the plurality of second processing complexes includes the operations of communicating state information to the particular second processing complex.

13. The method of claim 1, including communicating second state information from the particular second processing complex to the first processing complex, with said second state information required for processing packets of the flow of packets traveling in the first direction through the packet switching device.

14. The method of claim 1, wherein each processing complex of a group of the first processing complex and the plurality of second processing complexes does not have a common memory space for sharing said state information with another of the group of the first processing complex and the plurality of second processing complexes.

15. The method of claim 1, wherein each of said processing by the first processing complex and said processing by the particular second processing complex includes applying a Layer-4 to layer-7 application to packets of the flow of packets.

16. The method of claim 15, wherein said application is network address translation.

17. The method of claim 15, wherein said application is firewall.

18. The method of claim 1, wherein each of said processing by the first processing complex and said processing by the particular second processing complex includes performing forwarding processing in addition to applying a Layer-4 to layer-7 application to packets of the flow of packets.

19. A packet switching device, comprising:
a first line card including: a plurality of interfaces configured for sending and receiving packets with one or more devices external to the packet switching device; and a plurality of first processing complexes configured to perform service processing of packets of a same flow traveling in both first and reverse directions, including a particular first processing complex; wherein said service processing of packets includes applying a Layer-4 to layer-7 application;
a second line card, different than the first line card and with the second line card including a plurality of interfaces configured for sending and receiving packets with one or more devices external to the packet switching device; and
a switching fabric or switching matrix communicatively coupling the first line card and the second line card for sending packets between the first and second line cards;
wherein the packet switching device is configured to notify the second line card that the particular first processing complex will service process packets of a particular flow of packets traveling in said first and reverse directions through the packet switching device; and wherein the second line card is configured to send packets of the particular flow of packets traveling in the reverse direction within the packet switching device towards the first line card over the switching fabric or switching matrix addressed to the particular first processing complex and not simply to the first line card.

20. The packet switching device of claim 19, wherein the application is from the group consisting of: Firewall (FW), Network-based Application Recognition (NBAR), deep packet inspection (DPI), authentication, encryption, and Internet Protocol Security (IPsec).

21. The packet switching device of claim 19, wherein each of the plurality of first processing complexes is configured for determining forwarding information, including identification of an egress line card, for packets.

22. The packet switching device of claim 19, wherein the packet switching device includes a plurality of second line cards, each configured for sending and receiving packets with one or more devices external to the packet switching device; wherein the plurality of second line cards includes the second line card; and wherein the packet switching device is configured to notify each of the plurality of second line cards that the particular first processing complex will process packets of the particular flow of packets.

23. A packet switching device, comprising:
a switching fabric or switching matrix communicatively coupling a first line card and a second line card for sending packets between the first and second line cards;
the first line card including: a plurality of interfaces configured for sending and receiving packets with one or more devices external to the packet switching device; and a plurality of first processing complexes, including a particular first processing complex configured for processing packets of a particular flow of packets traveling in a first direction through the packet switching device; wherein said processing of said packets includes applying a particular Layer-4 to layer-7 application to said packets, and determining forwarding information for said packets and forwarding said packets accordingly; and
the second line card including: a plurality of interfaces configured for sending and receiving packets with one or more devices external to the packet switching device; and a plurality of second processing complexes, including a particular second processing complex configured for processing packets of the particular flow of packets traveling in a reverse direction through the packet switching device; wherein said processing packets of the particular flow of packets traveling in a reverse direction includes applying the particular Layer-4 to layer-7 application to said packets of the particular flow of packets traveling in a reverse direction, and determining forwarding information for said packets of the particular flow of packets traveling in a reverse direction and forwarding said packets of the particular flow of packets traveling in a reverse direction accordingly;
wherein the particular first processing complex and the particular second processing complex are configured for exchanging state information associated with the particular Layer-4 to layer-7 application so the other of the first and second processing complexes can apply the particular application; and wherein the packet switching device is configured to cause packets of the particular flow to travel along a same path of multiple paths through the packet switching device regardless of whether said Layer-4 to layer-7 application is applied.

24. The packet switching device of claim 23, wherein the packet switching device includes a plurality of second line cards, each configured for sending and receiving packets with one or more devices external to the packet switching device; wherein the plurality of second line cards includes the second line card; and wherein the packet switching device is configured to notify each of the plurality of second line cards that the particular first processing complex will process said packets of a particular flow of packets traveling in a first direction through the packet switching device.

* * * * *